United States Patent
Shiels et al.

(10) Patent No.: US 12,065,763 B2
(45) Date of Patent: Aug. 20, 2024

(54) METHOD OF MAKING A PHOSPHONATED PBI FIBER

(71) Applicant: PBI Performance Products, Inc., Charlotte, NC (US)

(72) Inventors: Brian P. Shiels, Charlotte, NC (US); Gregory S. Copeland, Tega Cay, SC (US); Feng Qin, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 1502 days.

(21) Appl. No.: 15/970,285

(22) Filed: May 3, 2018

(65) Prior Publication Data

US 2018/0251915 A1    Sep. 6, 2018

Related U.S. Application Data

(62) Division of application No. 15/193,206, filed on Jun. 27, 2016.

(Continued)

(51) Int. Cl.

| | |
|---|---|
| *D01F 6/74* | (2006.01) |
| *C08G 73/18* | (2006.01) |
| *D01F 1/07* | (2006.01) |
| *D06M 11/70* | (2006.01) |
| *D06M 11/84* | (2006.01) |

(52) U.S. Cl.
CPC ............ *D01F 6/74* (2013.01); *C08G 73/18* (2013.01); *D06M 11/70* (2013.01); *D01F 1/07* (2013.01); *D06M 11/84* (2013.01); *D06M 2200/30* (2013.01)

(58) Field of Classification Search
None
See application file for complete search history.

(56) References Cited

U.S. PATENT DOCUMENTS 2,251,931 A * 8/1941 Gundelfinger ..... D01D 10/0472
8/151.2
RE26,065 E     7/1966 Marvel et al.
(Continued)

FOREIGN PATENT DOCUMENTS

| EP | 0996989 B1 | 10/2001 |
|---|---|---|
| JP | 2012-238590 A | 12/2012 |
| WO | WO 2012-040332 A2 | 3/2012 |

OTHER PUBLICATIONS

Bourbigot et al (Heat Resistance and Flammability of High Performance Fibres: A Review; Fire Mater. 2002; 26: 155-168). (Year: 2002).*

(Continued)

*Primary Examiner* — Rachel Kahn
(74) *Attorney, Agent, or Firm* — Hammer & Associates, P.C.

(57) ABSTRACT

A method of making a phosphonated polybenzimidazole fiber comprises the steps of: spinning an untreated PBI resin into a PBI fiber; treating the PBI fiber with phosphoric acid, and thereby obtaining a PBI fiber with 1-25 wt. % phosphoric acid APU. A fiber is made with a polybenzimidazole (PBI) polymer with a phosphoric acid pick-up (APU) in the range of 1-25% (PBI-p fiber). The PBI-p fiber may have a LOI≥50% and/or an initial thermal decomposition temperature in air of ≥555° C.

5 Claims, 1 Drawing Sheet

Related U.S. Application Data

(60) Provisional application No. 62/188,812, filed on Jul. 6, 2015.

(56) References Cited

U.S. PATENT DOCUMENTS

| | | | |
|---|---|---|---|
| 3,433,772 A | | 3/1969 | Chenevey et al. |
| 4,506,068 A | | 3/1985 | Choe et al. |
| 4,717,764 A | | 1/1988 | Ward |
| 4,814,530 A | | 3/1989 | Ward et al. |
| 5,264,542 A | * | 11/1993 | Hughes ............ C08J 7/06 |
| | | | 528/331 |
| 5,277,981 A | | 1/1994 | Haider et al. |
| 5,976,447 A | * | 11/1999 | Mills ............ D01F 6/74 |
| | | | 264/344 |
| 6,042,968 A | | 3/2000 | Onorato et al. |
| 7,696,302 B2 | | 4/2010 | Calundann et al. |
| 2007/0151926 A1 | | 7/2007 | Calundann et al. |
| 2013/0244527 A1 | | 9/2013 | Sarzotti et al. |
| 2014/0357831 A1 | | 12/2014 | Benicewicz et al. |
| 2014/0360619 A1 | | 12/2014 | Underwood et al. |

OTHER PUBLICATIONS

Sidman, Kenneth R. et al., "Development of Thermally Stable Polybenzimidazole (PBI) Fiber", Technical Report ASD-TR-72-50, Nov. 1971.

E.J. Powers et al., "History and Development of Polymenzimidazole," Symposium on the History of High Performance Polymers—Apr. 15-18, 1986, American Chemical Society, New York.

* cited by examiner

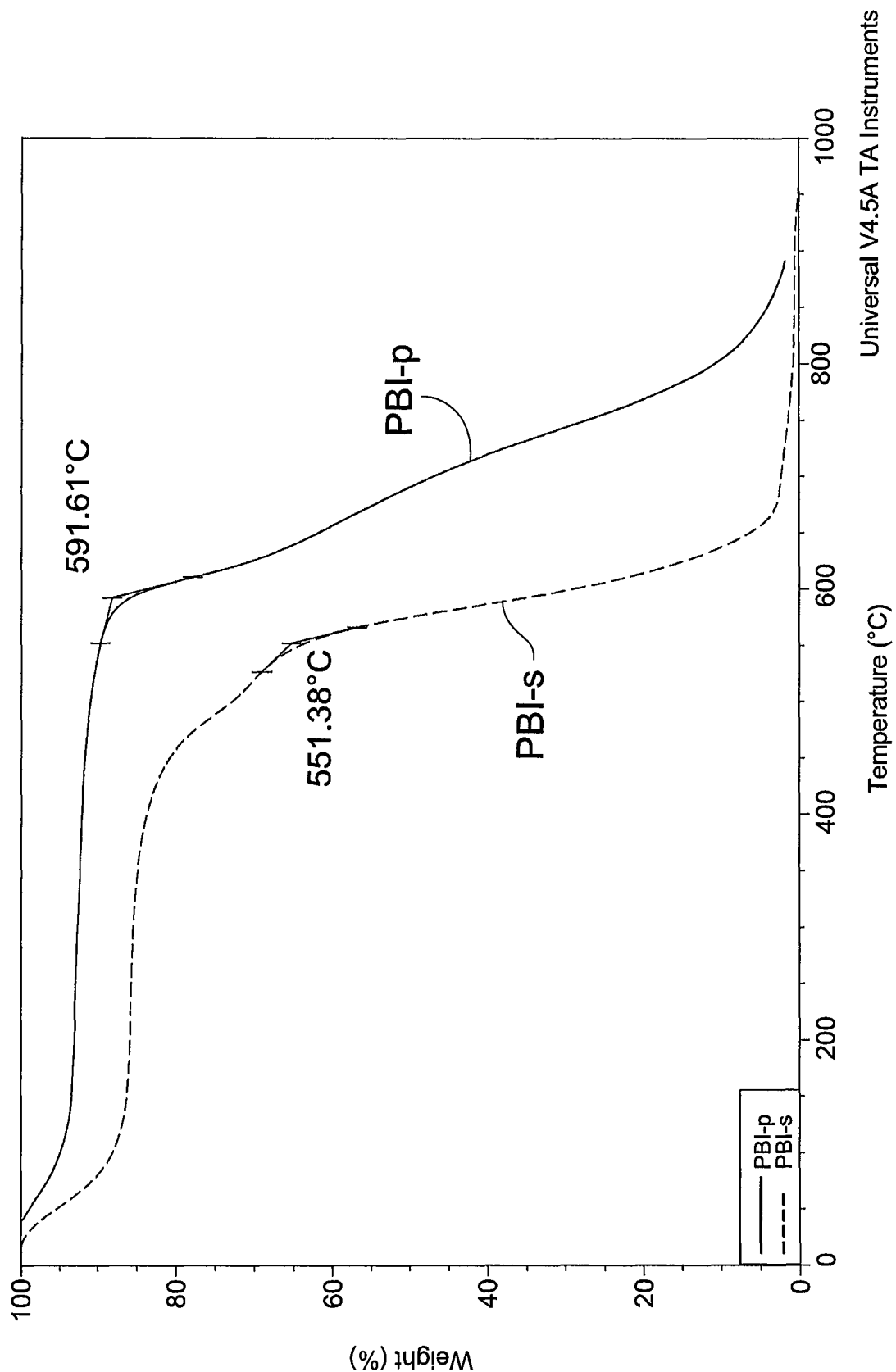

METHOD OF MAKING A PHOSPHONATED PBI FIBER

RELATED APPLICATIONS

This application claims the benefit of U.S. patent application Ser. No. 15/193,206 filed Jun. 27, 2016, now U.S. patent Ser. No. 11959196, which claimed the benefit of U.S. provisional patent application No. 62/188,812 filed Jul. 6, 2015, both of which are incorporated herein by reference.

FIELD OF THE INVENTION

The instant invention is directed to a method of making a polybenzimidazole fiber.

BACKGROUND

In the article, *History and Development of Polybenzimidazole* by E. J. Powers and G. A. Serad (presented on Apr. 15-18, 1986 and published in *High Performance Polymers: Their Origin and Development*), it is disclosed that a polybenzimidazole (PBI) polymer with 27 wt. % phosphoric acid ($H_3PO_4$) absorbed (or pick-up) may have utility as a very thermo-oxidatively stable fiber, pages 19-20 and Table XIII. Powers & Serad teach that the phosphonated PBI is made by soaking PBI films in 2% aqueous phosphoric acid, page 20.

Polybenzimidazole fibers, that have been commercially offered up until this time, are sulfonated. This sulfonated PBI fiber has met with great commercial success in, for example, fire fighters turnout gear, because it has a LOI (limiting oxygen index, ASTM D2863) of around 41.

In an effort to explore for and open up new applications and uses for PBI and articles made from FBI, the inventors have discovered new and more commercially advantageous phosphonated PBI fibers.

SUMMARY OF THE INVENTION

A method of making a phosphonated polybenzimidazole fiber comprises the steps of: spinning an untreated PBI resin into a PBI fiber; treating the PBI fiber with phosphoric acid, and thereby obtaining a FBI fiber with 1-25 wt. % phosphoric acid APU. A fiber is made with a polybenzimidazole (PBI) polymer with a phosphoric acid pick-up (APU) in the range of 1-25% (PBI-p fiber). The PBI-p fiber may have a LOI≥50% and/or an onset thermal degradation temperature ≥555° C. determined by Thermo-Gravimetric Analysis (TGA) in air at a 20° C./min heating rate.

DESCRIPTION OF THE DRAWING

For the purpose of illustrating the invention, there is shown in the drawing a form that is presently preferred; it being understood, however, that this invention is not limited to the precise arrangements and instrumentalities shown.

FIG. 1 is a TGA graph comparing the initial (or onset) thermal degradation temperatures of various PBI fibers in air at a 20° C./min heating rate.

DESCRIPTION OF THE INVENTION

Polybenzimidazole (FBI) fibers, phosphonated in the range of 1-25 wt. % phosphoric acid (or 1-25 wt % acid pick up (or APU) of phosphoric acid), have thermo-oxidative stability equal to or better than commercially available sulfonated PBI fibers (the range includes all sub-ranges included therein). Thereinafter, phosphonated FBI fiber will be referred to as PBI-p fiber, and sulfonated PBI fiber will be referred to as PBI-s fiber. In another embodiment, the PBI-p fiber has a phosphoric acid APU in the range of 4-20 wt. %. In still another embodiment, the PBI-p fiber has a phosphoric acid APU in the range of 8-24 wt. %. In still another embodiment, the PBI-p has a phosphoric acid pick-up in the range of 12-20 wt. %. In yet another embodiment, the PBI-p fiber has a phosphoric acid APU of about 17 wt. %. In still another embodiment, the PBI-p fiber may have an APU in the range of lower end-upper end, where the lower end of the weight range may be 1, 2, 3, 4, 5, 6, 7, 8, 9, 10, and 11, and the upper end of the weight range may be: 25, 24, 23, 22, 21, 20, 19, 18, 17, 16, 15, 14, 13, 12, 11, and 10.

PBI-p fibers may have any LOI (Limiting Oxygen Index—ASTM D2863). PBI-p fibers may have a LOI of about 47+% (≥47%). PBI-p fibers may have a LOI of 50+% (≥50%). PBI-p fibers may have a LOI of 55+% (≥55%). In one embodiment, PBI-p fibers may have a LOI of 60+% (≥60%). PBI-p fiber may have a LOI of ≥60% at ≥1% or 4% APU phosphoric acid. PBI-p fiber may have a LOI in a range of about 60-75% at ≥1% or 4% APU phosphoric acid. PBI-p fiber may have a LOI of ≥60% at about 4-25% APU phosphoric acid. PBI-p fiber may have a LOI in a range of about 60-75% at 4-25% APU phosphoric acid. PBI-p fiber may have a LOI in a range of about 60-75% at lower end-upper limit % APU phosphoric acid, where the lower end of the weight range may be 1, 2, 3, 4, 5, 6, 7, 8, 9, 10, and 11, and the upper limit is chosen from 25, 24, 23, 22, 21, 20, 19, 18, 17, 16, 15, 14, 13, 12, 11, and 10. PBI-p fiber may have a LOI of about 62.3% at about 7% APU phosphoric acid. PBI-p fiber may have a LOI of about 65.5% at about 12% APU phosphoric acid. PBI-p fiber may have a LOI of about 63.5% at about 17% APU phosphoric acid. Accordingly, one may obtain a thermo-oxidatively stable fiber without a 27 wt. % phosphoric acid pick-up. This is important because of the negative implications associated with phosphates in the environment. The LOI of PBI-s fibers is in the range of 41-44%.

In Thermal Gravimetric Analysis (TGA), changes of sample weight are measured as a function of increasing temperature. A sharp weight loss at high temperature often indicates decomposition of the sample. PBI-p fibers may have any temperature of onset of thermal decomposition in air, as determined by thermo-gravimetric analysis (TGA). TGA tests (using a TA Instrument Model TGA Q500) are conducted for a PBI-s sample and a PBI-p sample in air at a 20° C./min heating rate to up to 1000° C. The results are shown in FIG. 1. In the tests, PBI-s fiber sample has an initial thermal decomposition temperature of 551° C. and PBI-p fiber sample has an initial thermal decomposition temperature of ≥555° C. under the same testing conditions. For TGA tests in air at a 20° C./min heating rate, PBI-p fiber may have an initial thermal decomposition temperature in a range of about 555-625° C. at ≥1 wt. % APU phosphoric acid. PBI-p fiber may have an initial thermal decomposition temperature of ≥565° C. at about 4-25% APU phosphoric acid. PBI-p fiber may have an initial thermal decomposition temperature in a range of about 565-625° C. at 4-25% APU phosphoric acid. PBI-p fiber may have an initial thermal decomposition temperature in a range of about 565-625° C. at lower end-upper limit % APU phosphoric acid, where the lower end of the weight range may be 1, 2, 3, 4, 5, 6, 7, 8, 9, 10, and 11, and the upper limit is chosen from 25, 24, 23, 22, 21, 20, 19, 18, 17, 16, 15, 14, 13, 12, 11, and 10. The following is actual test data: PBI-p fiber has an initial thermal decomposition temperature of about 567° C. at about 7% APU phosphoric acid; PBI-p fiber has an initial thermal decomposition temperature of about 577° C. at about 12% APU phosphoric acid; and PBI-p fiber has an initial thermal decomposition temperature of about 592° C. at about 17% APU phosphoric acid.

PBI-p fiber may have any denier. PBI-p fiber may have a denier no greater than 6 denier per filament (dpf). PBI-p fiber may have a denier in the range of 0.1-5 dpf. In one embodiment, the fiber denier is in the range of 1-3 dpf.

Polybenzimidazoles (PBI) resins are a known class of compounds. See, for example, U.S. Re26065; U.S. Pat. Nos. 3,433,772; 4,717,764; and 7,696,302, each of which is incorporated herein by reference. Polybenzimidazole (PBI) resin may be any known PBI resin. PBI resins also refers to blends of PBI resins with other polymers, co-polymers of PBI, and combinations thereof. The PBI resin component may be the entire (100%) resin component or a major (i.e., at least 50 wt %) component. In general, PBI resins may be the product of the melt polymerization of a tetraamine (e.g., aromatic and heteroaromatic tetra-amino compounds) and a second monomer being selected from the group consisting of free dicarboxylic acids, alkyl and/or aromatic esters of dicarboxylic acids, alkyl and/or aromatic esters of aromatic or heterocyclic dicarboxylic acid, and/or alkyl and/or aromatic anhydrides of aromatic or heterocyclic dicarboxylic acid. Further details about PBI polymerization may be obtained from U.S. Pat. Nos. Re 26065; 4,506,068; 4,814, 530; and US Publication Nos. 2007/0151926 and 2014/0357831 (organic aldehyde adduct route), each of which is incorporated herein by reference. PBI resins and fibers are commercially available from PBI Performance Products, Inc. of Charlotte, NC.

Examples of PBI polymers include, but are not limited to: poly-2,2'-(m-phenylene)-5,5'-bibenzimidazole; poly-2,2'-(biphenylene-2"2"')-5,5'-bibenzimidazole; poly-2,2'-(biphenylene-4'4"')-5,5'-bibenzimidazole; poly-2,2'-(1",1",3"trimethylindanylene)-3"5"-p-phenylene-5,5'-bibenzimidazole; 2,2'-(m-phenylene)-5,5'-bibenzimidazole/2,2-(1",1",3"-trimethylindanylene)-5",3"-(p-phenylene)-5,5'-bibenzimidazole copolymer; 2,2'-(m-phenylene)-5,5-bibenzimidazole-2,2'-biphenylene-2",2"'-5,5'-bibenzimidazole copolymer; poly-2,2'-(furylene-2",5")-5,5'-bibenzimidazole; poly-2,2'-(naphthalene-1",6")-5,5'-bibenzimidazole; poly-2,2'-(naphthalene-2",6")-5,5'-bibenzimidazole; poly-2,2'-amylene-5,5'-bibenzimidazole; poly-2,2'-octamethylene-5,5'-bibenzimidazole; poly-2,2'-(m-phenylene)-diimidazobenzene; poly-2,2'-cyclohexenyl-5,5'-bibenzimidazole; poly-2,2'-(m-phenylene)-5,5'-di(benzimidazole)ether; poly-2,2'-(m-phenylene)-5,5'-di(benzimidazole)sulfide; poly-2,2'-(m-phenylene)-5,5'-di(benzimidazole)sulfone; poly-2,2'-(m-phenylene)-5,5'-di(benzimidazole)methane; poly-2,2"-(m-phenylene)-5,5"-di(benzimidazole)propane-2,2; and poly-ethylene-1,2-2,2"-(m-phenylene)-5,5"-dibenzimidazole)ethylene-1,2 where the double bonds of the ethylene groups are intact in the final polymer. Poly-2,2'-(m-phenylene)-5,5'-bibenzimidazole is preferred.

In general, PBI-p fiber may be made by: spinning PBI resin (without any acid treatment, i.e., untreated), and treating the fibers with phosphoric acid.

Spinning may be by any conventional spinning technique. One such technique is solution spinning where a dope (PBI dissolved in a suitable solvent) is spun through a spinneret, and subsequently taken-up after solvent removal.

Treating may include the steps of applying the phosphoric acid to the untreated fiber, and, after a suitable residence time, removal and/or drying of the treated fiber. Applying the phosphoric acid may be conducted by any conventional method. Conventional methods include, but are not limited to, dipping (e.g., via a bath), spraying, brushing, roller coating, and the like. In one embodiment, the treating may be conducted in a bath of phosphoric acid. In one embodiment, the residence time (time that fiber is immersed in the acid bath) may be in the range of 15-360 seconds. In another embodiment, the residence time may be in the range of 20-180 seconds. In yet another embodiment, the residence time may be in the range of 20-70 seconds. The bath may be at any temperature. In one embodiment, the bath has a temperature in the range of 15-60° C. In another embodiment, the bath has a temperature in the range of 20-50° C. In yet another embodiment, the temperature may be range of 25-40° C. In yet another embodiment, the temperature may be in the range of 30-40° C. The phosphoric acid used in the treatment step may be any concentration of phosphoric acid. In one embodiment, the phosphoric acid (aqueous) has a concentration in the range of 10-85 wt. %. In another embodiment, the phosphoric acid (aqueous) has a concentration in the range of 20-60 wt. %. In still another embodiment, the phosphoric acid (aqueous) has a concentration in the range of 40-60 wt. %. In yet another embodiment, the phosphoric acid (aqueous) has a concentration of about 50 wt. %. While applying the phosphoric acid, the fiber may under tension. In one embodiment, the tension may range from 1.0-25.0 dN (as measured by a conventional tensiometer on a subtow). In another embodiment the tension may be in the range of 2-12 dN. In still another embodiment, the tension may be in the range of 2-8 dN. In yet another embodiment, the tension may be in the range of 2.5-7.5 dN. Removal of excess acid and/or drying may be conducted in any manner. Removal and/or drying may include an optional rinse to remove residual acid.

PBI-p fibers may be used in any application. Such applications include, but are not limited to: textile applications, mechanical applications, and additives for plastics. In the textile applications, the fibers (either staple of filament) may be combined with other fiber to spin yarns. The yarns may be woven or knitted into fabrics. The fabrics may be cut and sewn into garments. These textile processes are conventional. The PBI-p fibers may also be converted to nonwovens by any conventional technique. The mechanical applications include, for example, gaskets and seals.

EXAMPLES

Extruded polybenzimidazole fiber was washed in hot water to remove spinning solvent and then space drawn in a heated oven to improve its tensile properties. The fiber was then treated with 50% (wt) aqueous phosphoric acid by submerging the fibers in a bath for 48-52 seconds from entry to exit of the unit (the fiber was immersed in the liquid for about 25 seconds). The bath temperature was held at 35° C. The fiber was then squeezed to dry it and washed with water at room temperature. The washed fiber was then dried in an air non-contact oven operating at 350° C. The dry fiber was then heat treated in a nitrogen blanketed oven operating at 565° C. to fix the acid within the polymer structure. Subsequent textile treatment processes resulted in the phosphonated fiber being produced as a two inch cut staple fiber. The 1.5 denier per filament (dpf) cut staple fiber had a tenacity of 2.00 g/dN, an elongation at break of 10.88%, and an acid pick-up* of 17-20 wt %. *Acid pick-up values were determined by mass balance, and verified by elemental analysis. Mass balance—Acid Content was derived using a mass balance evaluating the weight gain of the fiber. The moisture is removed from the sample and the remaining mass is divided by the dry PBI from the creel. The balance is then checked with a second balance around the acid concentrations in the bath, waste-water, and consumption. Elemental analysis—Acid Content was derived using elemental analysis by Inductively Coupled Plasma Optical Emission Spectrometry (ICP-OES). The ICP-OES method determines the percent of a particular element present in a sample. In the case of the example fiber, ICP-OES determined the presence of 5.51% Phosphorous. However, phosphorous is present on the example fiber as Phosphate ($PO_4$). Phosphorous is present in Phosphate at approximately 32%. Therefore, the presence of 5.51% Phosphorous tells us that Phosphate (acid) pick-up is approximately 17%.

Preliminary laboratory phosphoric acid treatment of extruded PBI fiber is further illustrated with the data presented in Table below.

| | Estimated Dry Wt g | Orig. Fiber wt. g | % acid used | Temp C. | Time in acid Sec | Time in H2O Sec | Time in oven 1st drying Sec | Time in oven 2nd drying Sec | Wt after 2nd drying g | Drying Condition (in oven) C. | Acid Pickup (APU) wt % | Note |
|---|---|---|---|---|---|---|---|---|---|---|---|---|
| 1 | 0.60 | 0.7 | 30% | room | 60 | 15 | 300 | 100 | 0.68 | 180 | 14.3% | |
| 2 | 0.63 | 0.74 | 50% | room | 60 | 15 | 300 | 100 | 0.76 | 180 | 20.8% | |
| 3 | 0.60 | 0.71 | 85% | room | 60 | 15 | 300 | 100 | 0.67 | 180 | 11.0% | |
| 4 | 0.70 | 0.82 | 30% | room | 60 | 15 | 300 | 100 | 0.78 | 180 | 11.9% | |
| 5 | 0.65 | 0.77 | 50% | room | 60 | 15 | 300 | 100 | 0.79 | 180 | 20.7% | |
| 6 | 0.70 | 0.82 | 85% | room | 60 | 15 | 300 | 100 | 0.83 | 180 | 19.1% | |
| 7 | 0.71 | 0.83 | 30% | room | 60 | 0 | 300 | 100 | 1.14 | 180 | 61.6% | |
| 8 | 0.62 | 0.73 | 50% | room | 60 | 0 | 300 | 100 | 1.29 | 180 | 107.9% | |
| 9 | 0.67 | 0.79 | 85% | room | 60 | 0 | 300 | 100 | 1.88 | 180 | 180.0% | |
| 10 | 0.76 | 0.89 | 30% | 50 | 60 | 15 | 300 | 100 | 1 | 180 | 32.2% | |
| 11 | 0.65 | 0.76 | 50% | 50 | 60 | 15 | 300 | 100 | 1.02 | 180 | 57.9% | |
| 12 | 0.71 | 0.84 | 30% | 40 | 60 | 15 | 300 | 100 | 0.84 | 180 | 17.6% | |
| 13 | 0.70 | 0.82 | 50% | 40 | 60 | 15 | 300 | 100 | 1 | 180 | 43.5% | |
| 14 | 0.34 | 0.4 | 50% | 60 | 60 | 15 | 900 | 100 | 0.52 | 105 | 52.9% | with tension |
| 15 | 0.34 | 0.4 | 50% | 60 | 60 | 15 | 900 | 100 | 0.51 | 105 | 50.0% | |
| 16 | 0.36 | 0.42 | 50% | 45 | 60 | 15 | 1800 | 0 | 0.51 | 105 | 42.9% | |
| 17 | 0.34 | 0.4 | 50% | 45 | 60 | 15 | 1800 | 0 | 0.53 | 105 | 55.9% | |
| 18 | 0.38 | 0.45 | 50% | 45 | 60 | 15 | 1800 | 0 | 0.48 | 105 | 25.5% | with tension |
| 19 | 0.37 | 0.44 | 50% | 45 | 60 | 15 | 1800 | 0 | 0.46 | 105 | 23.0% | with tension |

The present invention may be embodied in other forms without departing from the spirit and the essential attributes thereof, and, accordingly, reference should be made to the appended claims, rather than to the foregoing specification, as indicated the scope of the invention.

We claim:

1. A method of making a phosphonated polybenzimidazole (PBI) fiber comprising the steps of:
   spinning an untreated PBI resin into a PBI fiber;
   immersing the PBI fiber in a phosphoric acid bath, wherein the bath is maintained at 35° C.;
   squeezing the phosphoric acid-treated PBI fiber to dry the fiber;
   washing the squeezed-dry PBI fiber with water at room temperature;
   drying the washed PBI fiber in an air non-contact oven at 350° C.; and
   heat-treating the air-dried PBI fiber in a nitrogen-blanketed oven at 565° C. to fix the acid within the polymer structure;
   thereby obtaining a phosphonated PBI fiber with a phosphoric acid pick-up (APU) in the range of 1-25 wt % and having a Limiting Oxygen Index (LOI) per ASTM 2863 of about ≥47%.

2. The method of claim 1, wherein the phosphoric acid bath is an aqueous solution with a phosphoric acid concentration of 10-85 wt %.

3. The method of claim 1, wherein the phosphoric acid bath is an aqueous solution with a phosphoric acid concentration of 40-60 wt %.

4. The method of claim 1, wherein the phosphoric acid bath is an aqueous solution with a phosphoric acid concentration of 50 wt %.

5. The method of claim 1, further comprising tensioning the PBI fiber while immersing in the phosphoric acid bath.

* * * * *